United States Patent [19]

Spiewak

[11] 3,975,331

[45] Aug. 17, 1976

[54] PROCESS FOR PRODUCING AROMATIC POLYAMIDES FROM AMIDINE DERIVATIVES OF POLYAMIDE FORMING REACTANTS

[75] Inventor: John W. Spiewak, Akron, Ohio

[73] Assignee: The Firestone Tire & Rubber Company, Akron, Ohio

[22] Filed: Dec. 20, 1973

[21] Appl. No.: 426,879

[52] U.S. Cl. ............................ 260/78 R; 260/78 A
[51] Int. Cl.² ........................................ C08G 69/32
[58] Field of Search ............. 260/78 R, 78 A, 78 TF

[56] References Cited
UNITED STATES PATENTS
3,094,511  6/1963  Hill et al. .......................... 260/78 R
3,475,387  10/1969  Carter et al. ...................... 260/78 R OTHER PUBLICATIONS
Chemical Abstracts, vol. 55, p. 3608e – 3609, 1961.

Primary Examiner—Harold D. Anderson

[57] ABSTRACT

Polyamides, particularly aromatic polyamides and mixed aromatic-aliphatic polyamides, are produced by heating various amidines or amidine derivatives to yield polymer and a volatile low molecular weight amide, such as formamide. The thermally polymerizable composition is an aromatic amidine or salt thereof, e.g. N,N-1,4-phenylene bis-(N',N'-dimethylformamidinium) terephthalate which is heat polymerizable to poly-(p-phenylene terephthalamide); or N-(p-carboxyphenyl)-N',N'-dimethyl formamidine hydrochloride which is heat polymerizable to poly-(p-benzamide).

25 Claims, 21 Drawing Figures

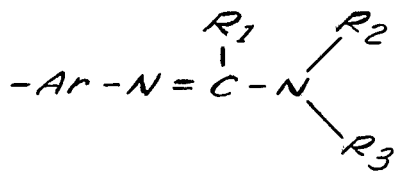
Fig. 1 (FORMULA I)
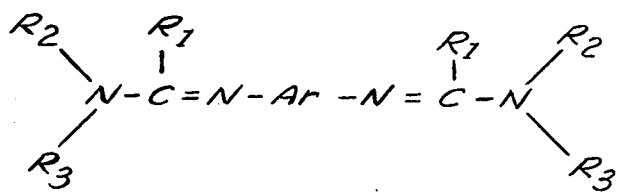
Fig. 2 (FORMULA II)
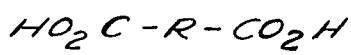
Fig. 3 (FORMULA III)
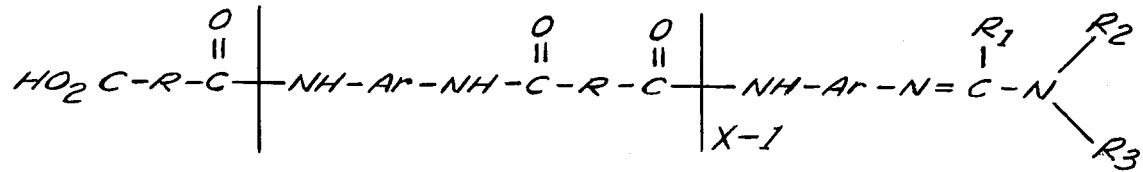
Fig. 4 (FORMULA IV)
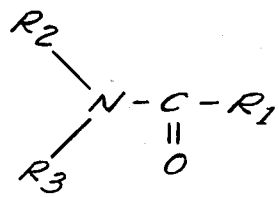
Fig. 5 (FORMULA V)
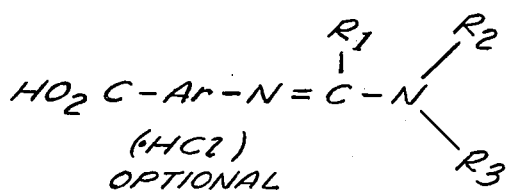
(·HCl) OPTIONAL
Fig. 6 (FORMULA VI)
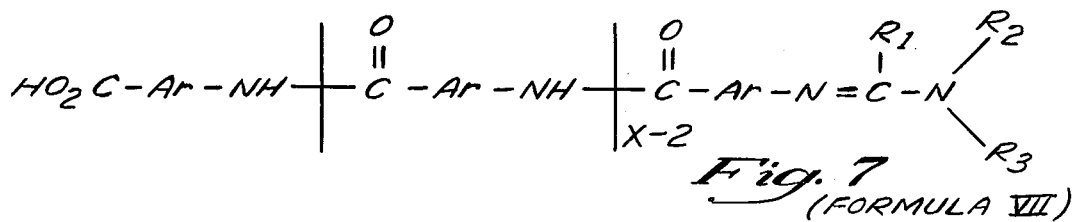
Fig. 7 (FORMULA VII)

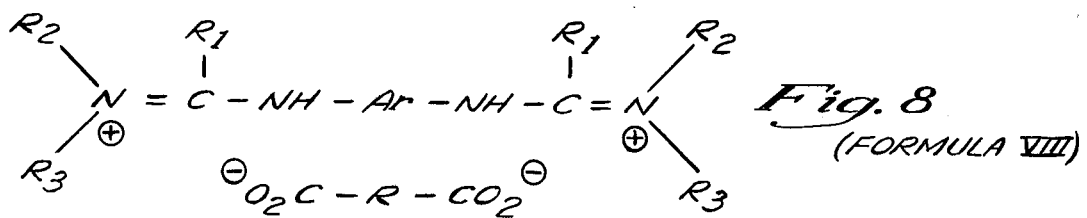
Fig. 8 (FORMULA VIII)
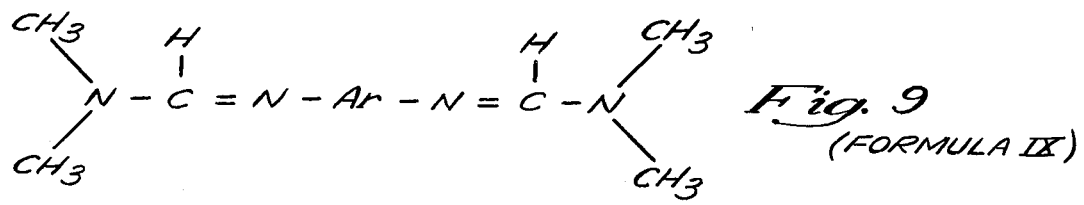
Fig. 9 (FORMULA IX)
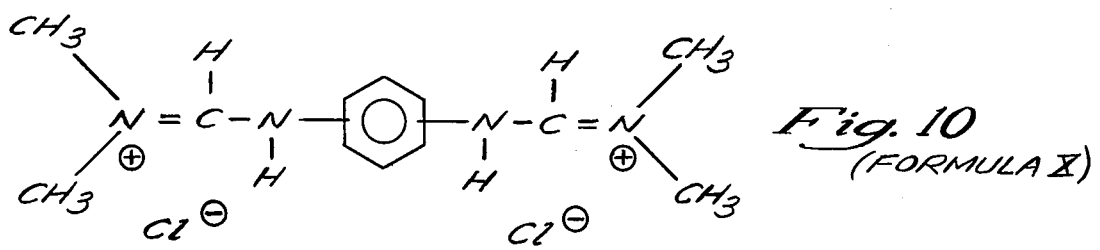
Fig. 10 (FORMULA X)
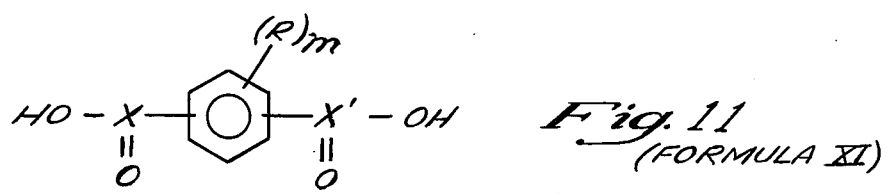
Fig. 11 (FORMULA XI)
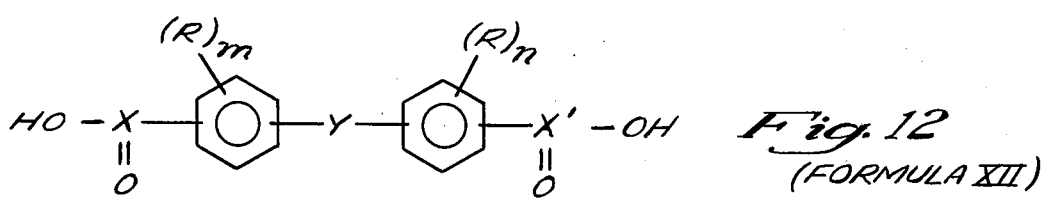
Fig. 12 (FORMULA XII)
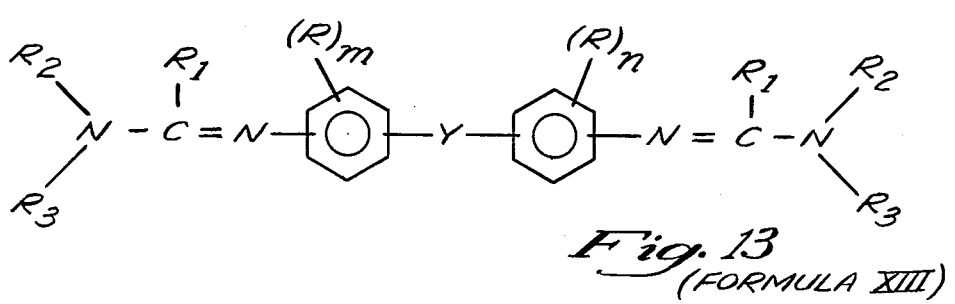
Fig. 13 (FORMULA XIII)

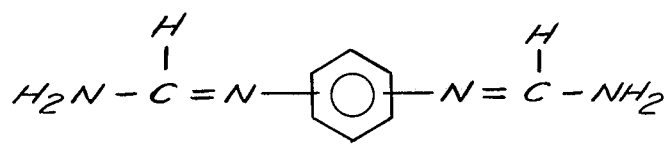
*Fig. 14*
(FORMULA XIV)
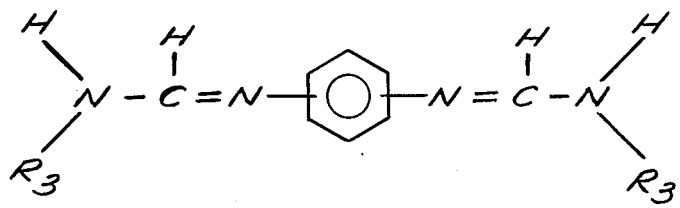
*Fig. 15*
(FORMULA XV)
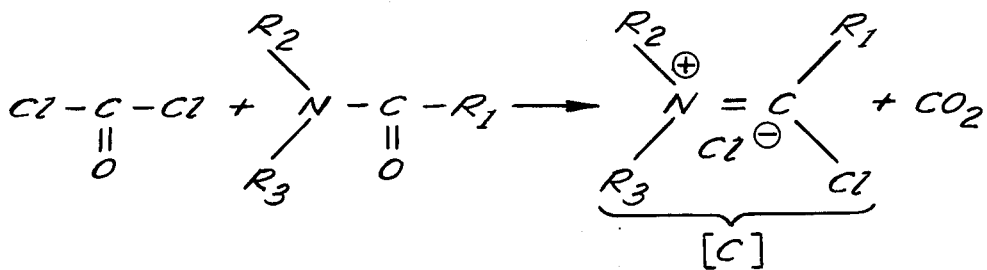
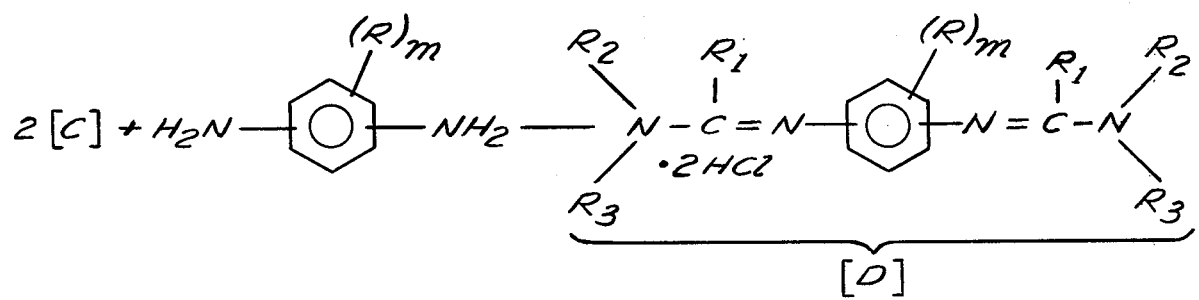
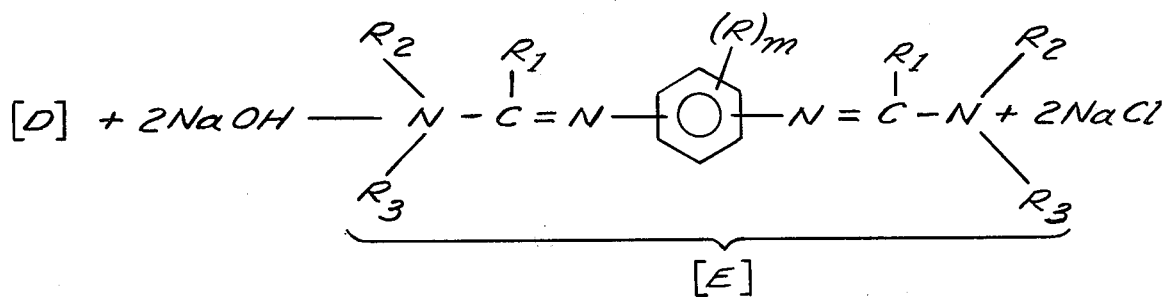
*Fig. 16*
(EQUATION 1)

(EQUATION 2)

(EQUATION 3)

(EQUATION 4)

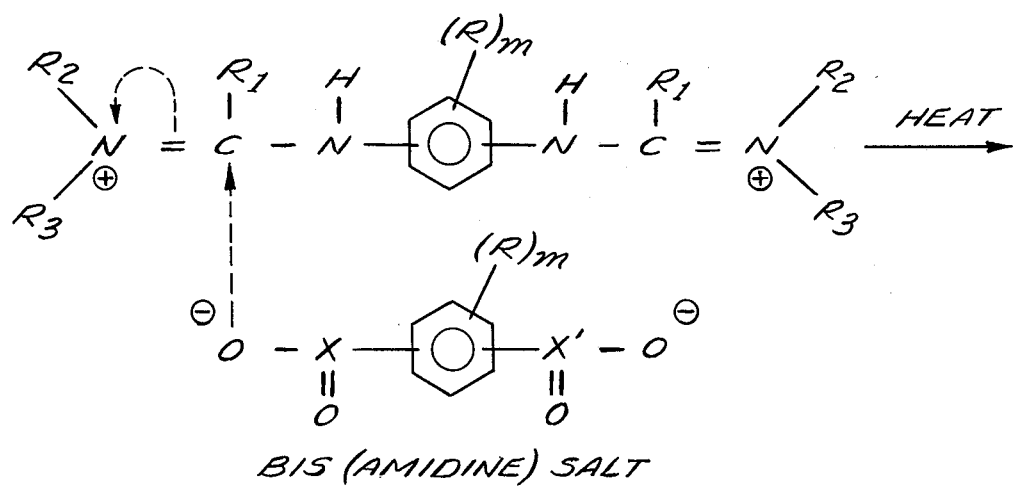
BIS (AMIDINE) SALT
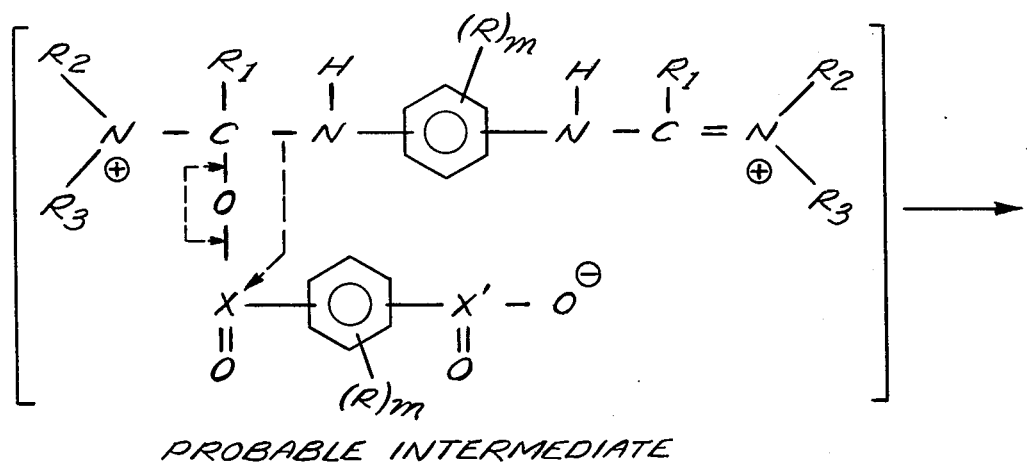
PROBABLE INTERMEDIATE
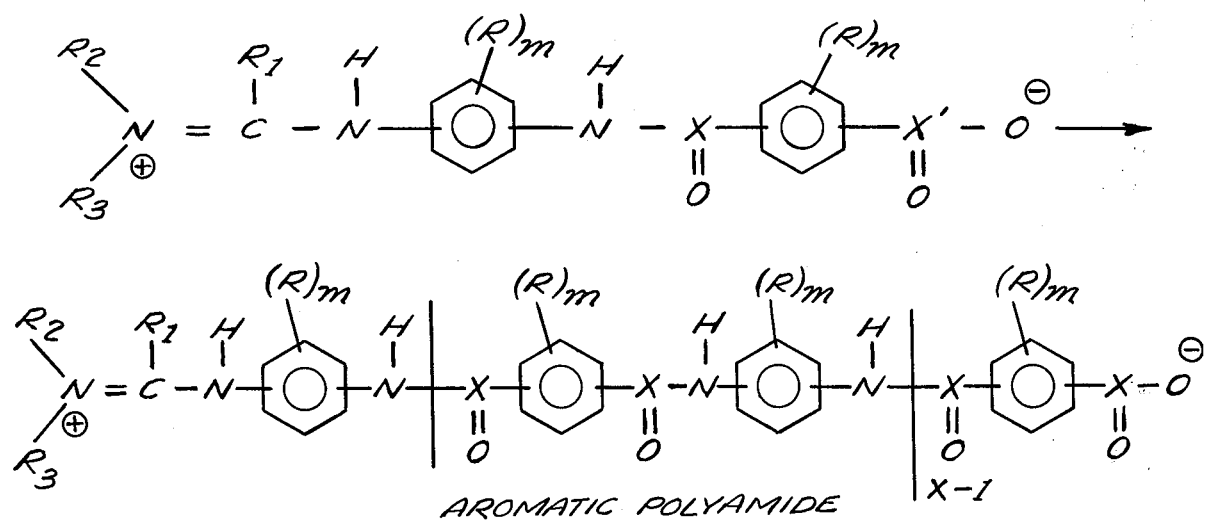
AROMATIC POLYAMIDE
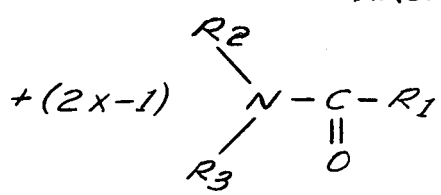
Fig. 20
(MECHANISM 1)

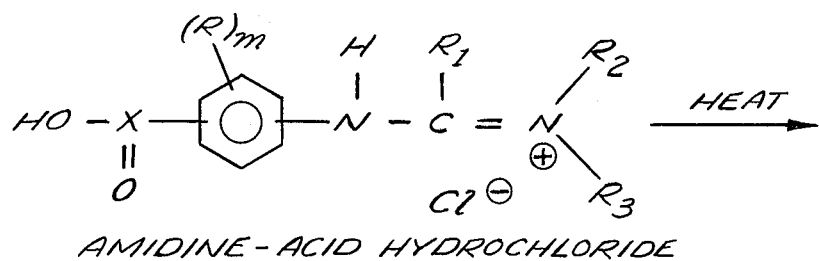
AMIDINE-ACID HYDROCHLORIDE
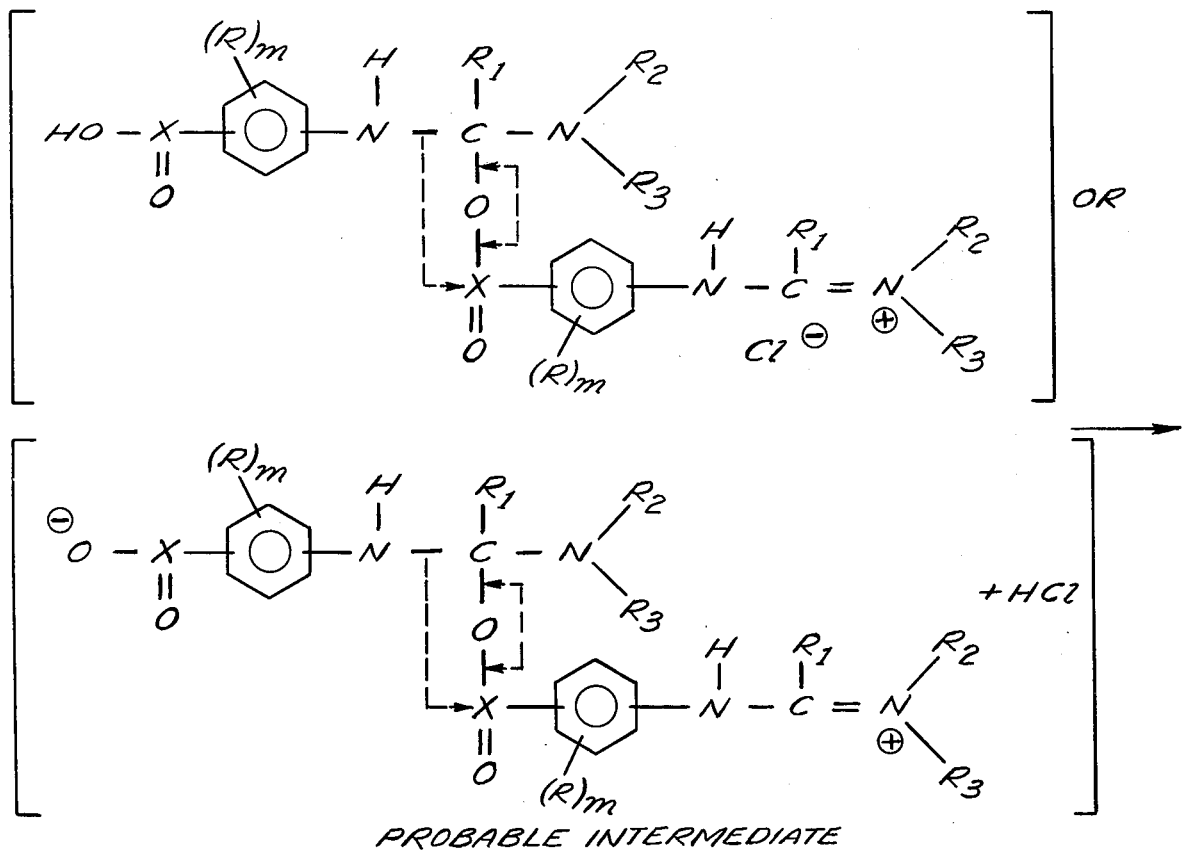
PROBABLE INTERMEDIATE
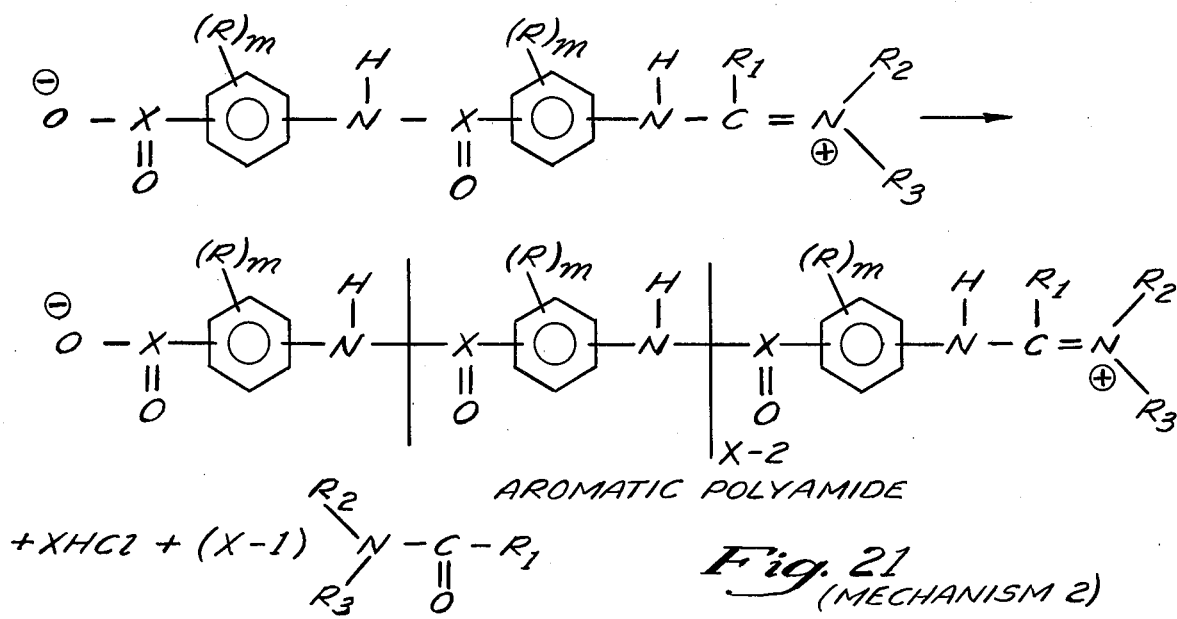
AROMATIC POLYAMIDE
Fig. 21 (MECHANISM 2)

PROCESS FOR PRODUCING AROMATIC POLYAMIDES FROM AMIDINE DERIVATIVES OF POLYAMIDE FORMING REACTANTS

BACKGROUND OF THE INVENTION AND PRIOR ART

The present invention relates, as indicated, to a novel process for the production of aromatic polyamides and mixed aromatic-aliphatic polyamides. The term "aromatic polyamides" as used herein will be understood as generic to mixed aromatic-aliphatic polyamides. Relatively few such polyamides have been produced to this point, this field of investigation being quite new. One notable product, however, is poly(p-benzamide), also once known as "Fiber B" and produced by DuPont Company. This material has been found useful in the production of tire cord materials. The present process enables the production of aromatic polyamide materials very similar to poly(parabenzamide) and related types of aromatic polyamides.

Basically, the present process depends upon the thermal polymerization of certain amidine materials and derivatives thereof. The rearrangement which is involved in the polymerization step appears to be unknown. These polymerizations are characterized by the formation of a low molecular weight alkyl amide such as formamide or acetamide which is easily removed from the reaction mass, leaving the aromatic polyamide as a residue.

Prior art relating to the monomers and condensation products thereof appears to be quite limited. U.S. Pat. No. 3,133,078 to Steiger contemplates the production of certain oxazol formamidines of primary amines which are pharmaceutically useful. Bredereck et al. Chem. Ber., 97(12), 3397–3406 (1964), teaches the preparation of N,N-1,4-phenylene bis-(N′,N′-dimethyl formamidine) hydrochloride and the free base thereof. This material is produced from phosphorus oxychloride and dimethyl formamide in benzene. French Pat. No. 1,444,228 dated July 1, 1966, teaches the preparation of a bis-formamidine derived from an aliphatic diamine and reacted with an aliphatic diisocyanate to yield a polymer which is filmforming. The reaction is conducted in the presence of water.

Cefelin et al., Collection of Czech. Chemical Comm. 25 2522–9 (1960) discloses a reaction between N,N′-bis[2-(1-azacycloheptenyl)]-p-phenylene diamine with terephthalic acid for a period of 2 hours at 260°C. This is said to yield a polyamide which is light brown and melts at a temperature more than 400°C.

The present invention is based upon the discovery that various aromatic amidine and amidine derivatives may be thermally polymerized to produce a whole range of aromatic polyamides. These polymers may be used to form filaments and yarns by the application of known techniques. The resultant filaments, as monofilaments or as yarns, may in accordance with known practice be used in the preparation of reinforcing elements for elastomeric materials, e.g. tire cord materials.

Definitions of Symbols Used Herein:

Ar = aromatic ring, e.g. phenylene, naphthylene.
R = alkyl and substituted alkyl, aryl and substituted aryl, alkyl and/or aryl substituted by halogen (chlorine, bromine, fluorine, iodine), alkoxy, aryloxy, carboalkoxy, carboaryloxy, carboxamide, N-substituted carboxamide, carboxamido, N-substituted carboxamido, sulfonamide, N-substituted sulfonamido, cyano, cycloalkyl, heterocycloalkyl, heteroaryl, and substituted cycloalkyl, substituted heterocycloalkyl, substituted heteroaryl, the substituents being selected from different R groups as defined.

$R_1$ = hydrogen, or lower alkyl, e.g. methyl, ethyl, n-propyl, isopropyl.
$R_2$ = lower alkyl, e.g. methyl or H.
$R_3$ = lower alkyl, e.g. methyl or H.
X = carbon.
X′ = carbon.
Y = a covalent bond, or a divalent radical, e.g. alkylene, cycloalkylene, branched alkylene, halogen-substituted alkylene, halogen-substituted branched alkylene, halogen-substituted cycloalkylene, alkoxy-substituted alkylene, alkoxy-substituted branched alkylene, thioalkoxy-substituted alkylene, thioalkoxy-substituted branched alkylene, arylene, alkyl arylene, alkoxy arylene, thioalkoxy arylene, $$-O-, \quad -S-, \quad \overset{O}{\underset{}{\overset{\|}{-S-}}}, \quad \overset{O}{\underset{\underset{O}{\|}}{\overset{\|}{-S-}}}, \quad -N=N-, \quad \overset{H}{\underset{}{\overset{|}{-N-}}},$$

heteroarylene, heterocycloalkylene, etc.
m = an integer from 1 to 4.
n = an integer from 1 to 4.
(R) = hydrogen, or R.
x = an integer to an inherent viscosity in the range of 0.2 to 7 as measured in concentrated $H_2SO_4$ at 0.5% concentration at 25°C.

BRIEF DESCRIPTION OF THE DRAWINGS

FIG. 1 depicts the general formula of the characterizing group of the amidine composition of matter provided in accordance with the present invention, hereinafter referred to as Formula I;

FIG. 2 depicts the general formula of a bis(amidine), hereinafter referred to as Formula II;

FIG. 3 depicts the general formula of the dicarboxylic acid, hereinafter referred to as Formula III;

FIG. 4 depicts the general formula of an aromatic polyamide, hereinafter referred to as Formula IV;

FIG. 5 depicts an alkyl amide by-product, hereinafter referred to as Formula V;

FIG. 6 depicts the general formula of an amidine carboxylic acid and an optional monoacid substituted amidine hydrochloride, hereinafter referred to as Formula VI;

FIG. 7 depicts the general formula of an aromatic polyamide, hereinafter referred to as Formula VII;

FIG. 8 depicts the general formula of an alkyl substituted bis(amidinium (amidinium carboxylate salt), hereinafter referred to as Formula VIII;

FIG. 9 depicts the general formula of an arylene bis (N′, N′, dimethyl formamidine), hereinafter referred to as Formula IX;

FIG. 10 depicts the general formula of an arylene bis(alkyl substituted bis amidinium-acid chloride), hereinafter referred to as Formula X;

FIG. 11 depicts the general formula of an organic diacid, hereinafter referred to as Formula XI;

FIG. 12 depicts the general formula of an organic diacid, hereinafter referred to as Formula XII;

FIG. 13 depicts the general formula of a polyarylene bis(amidine), hereinafter referred to as Formula XIII;

FIG. 14 depicts the general formula of a mono-substituted bis-formamidine, hereinafter referred to as Formula XIV;

FIG. 15 depicts the general formula of a di-substituted bis-formamidine, hereinafter referred to as Formula XV;

FIG. 16 depicts a first mode of synthesis for the preparation of N, N-arylene bis(amidines), hereinafter referred to as Equation 1;

FIG. 20 depicts a suggested mechanism by which aromatic polyamides are produced from a bis(amidine) salt, hereinafter referred to as Mechanism 1; and FIG. 21 depicts a suggested mechanism by which aromatic polyamides are produced from an amidine-acid hydrochloride, hereinafter referred to as Mechanism 2.

BRIEF DESCRIPTION OF THE INVENTION

Figure 17:
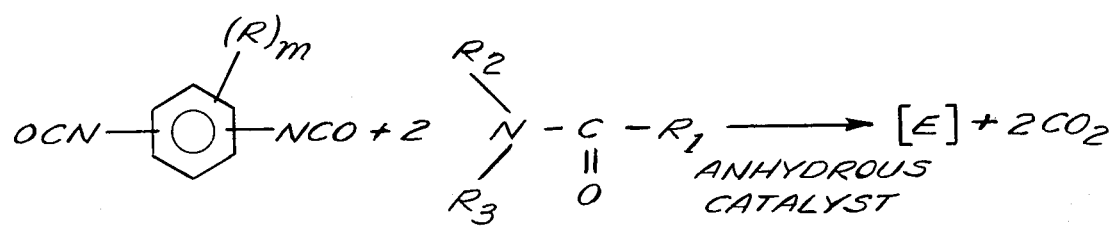
FIG. 17 depicts a second mode of synthesis for the preparation of N, N-arylene bis(amidines), hereinafter referred to as Equation 2.
Figure 18:
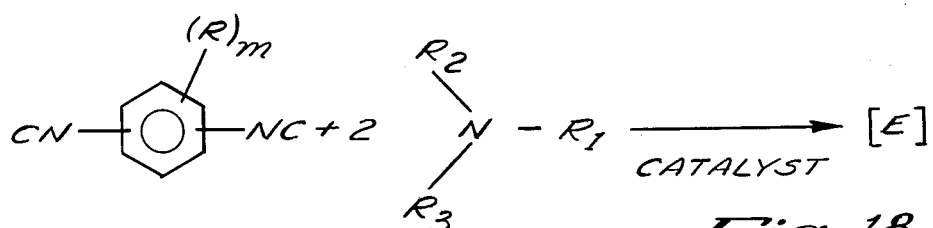
FIG. 18 depicts a third mode of synthesis for the preparation of N, N-arylene bis(amidines), hereinafter referred to as Equation 3.
Figure 19:
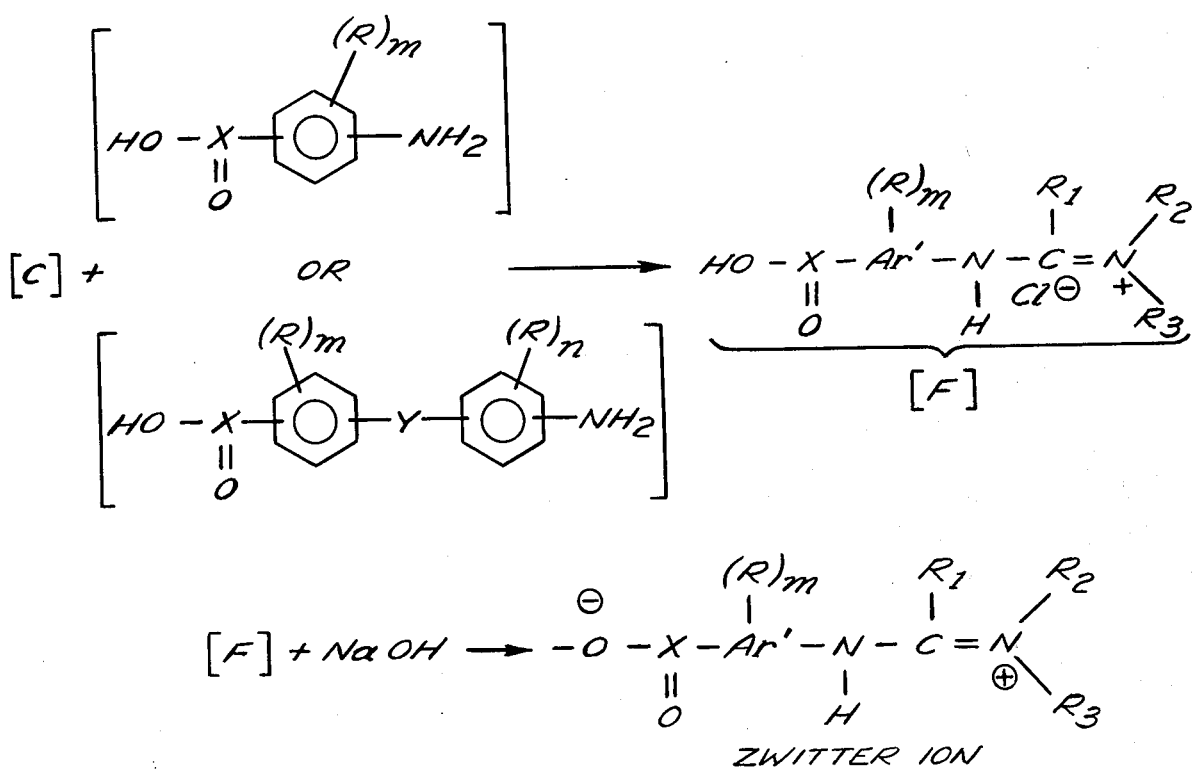
FIG. 19 depicts a method for the preparation of monocarboxylic-substituted aryl amidine hydrochlorides, hereinafter referred to as Equation 4.

Briefly stated, the present invention is in a process for forming an aromatic polyamide which comprises heating to a temperature where a volatile alkyl amide such as formamide (Formula V) is evolved, an amidine composition of matter characterized by the group (Formula I), which amidine composition is selected from the group consisting of (A) a dicarboxylic acid (Formula III) salt of a bisamidine having the general formula (Formula II) and (B) an amidine-carboxylic acid having the general formula (Formula VI) wherein Ar is a divalent aromatic radical, $R_1$ is a lower alkyl radical containing from 1 – 3 carbon atoms or hydrogen and $R_2$ and $R_3$ are hydrogen or methyl. The rearrangement which occurs when these monomers are heated to temperatures of the order of 225°C or higher results in the formation of a polyamide (for example, Formula IV) and causes the evolution of a lower alkyl amide such as formamide or acetamide.

It is a principal object of the present invention, therefore, to prepare high molecular weight polycondensation polymers from alkyl-substituted amidines (Formulas IX, VI, and VIII) derived from primary amines that are reacted with carboxylic acids (Formula III). The polymers obtained are polyamides (Formulas IV and VII). A di-substituted amide (Formula V) is always a by-product. The invention is most useful in the preparation of aromatic polyamides from dialkyl formamidines derived from primary aromatic amines. Heretofore, similar polymers could only be prepared from the more expensive acid chlorides when polyamides and polysulfonamides are desired.

The present invention avoids the use of carboxylic acid chlorides which are moisture sensitive and more expensive than the corresponding carboxylic acids utilized in the present invention. Also, the present invention overcomes or avoids the use of oxidatively sensitive aromatic diamines which are not capable of forming balanced salts with dicarboxylic acids. Instead, in accordance with the present invention, the bis(amidines) (Formula II) form stoichiometric balanced salts with such dicarboxylic acids (Formula III) which do not limit the degree of polymerization. Simple monomer preparation is available from readily available diamines.

It has now been found that N,N-bis(N', N'-dialkyl alkamidines) and aromatic dibasic acids react in a 1:1 ratio to form salts. It also has been found that polymerization of the preformed salt or a mixture of the above bisalkamidine and the dicarboxylic acid by a chemical mechanism heretofore unknown in the patent literature may be used to produce polyamides and by-product dialkyl alkamide (Mechanism 1). It has also been discovered that one can polymerize by heat an aromatic alkamidine-carboxylic acid derived from an aromatic amino acid to yield a polyamide and N,N-dialkyl alkamide and hydrogen chloride when the aromatic alkamidinium carboxylic acid hydrochloride is utilized. (See Mechanism 2).

The use of the N',N'-dimethyl formamidine compounds derives from the ease of monomer preparation and therefore the eventual ease of commercialization. It must be pointed out that a similar easy preparative route to the corresponding N',N'-dimethyl acetamidine monomer family is also contemplated from the reaction between dimethyl acetamide, phosgene and the corresponding aromatic amine.

DETAILED DESCRIPTION OF THE INVENTION AND SPECIFIC EXAMPLES

As indicated above, the aromatic polyamides of the present invention are produced by heating certain amidine materials and derivatives thereof. Basic to these preparations are certain N,N-arylene bis(amidines) (Formula II) and certain monoacid substituted aryl amidine hydrochlorides (Formula VI). It becomes convenient to discuss the preparation of these starting materials individually.

Preparation of the N,N-arylene bis(amidines)

Three modes of synthesis may be followed for the preparation of N,N-arylene bis(amidines). These are represented in Equations 1, 2 and 3 in the annexed drawings. Of these, the synthesis represented by Equation 1 is preferred because the starting materials are readily available.

Although the use of phosgene is schematically represented only in Equation 1, this material is nevertheless involved in the synthesis of the diisocyanates and diisocyanides by known mechanisms, the starting materials in Equations 2 and 3, respectively. Because phosgene is extremely reactive toward many organic moieties, it is convenient to incorporate these moieties into the final polymer structure by synthesizing them into the organic diacid monomer instead of the N,N-arylene bis(amidine) monomer. Thus, all three synthetic routes to the production of N,N-arylene bis(amidines) involve the use of phosgene either directly or indirectly, as indicated.

The method of Equation 2 for the preparation of N,N-arylene bis(amidines) is one in which a diisocyanate is reacted with two mols of a N,N-dialkyl amide in the presence of anhydrous HCl as a catalyst. French Pat. No. 1,444,228 teaches a similar process utilizing instead of aromatic diisocyanates as used herein aliphatic diisocyanates. Commercially available useful aromatic diisocyanates include materials such as methylene-4,4'-diphenyl diisocyanate; 3,3'-dimethyl biphenyl-4,4'-diisocyanate; and toluene 2,4-diisocyanate as well as others to prepare the N,N-arylene bis-(amidines) according to Equation 2. Other such diisocyanate materials are well known to those skilled in the art.

The synthesis of Equation 3 for the preparation of N,N-arylene bis(amidines) are commercially less attractive at the present time than the other two routes of Equations 1 and 2 because at least two steps of isolation and purification are required to prepare the diisocyanide. According to this procedure, an aromatic diisocyanide is reacted with an aliphatic amine in an addition reaction with no by-products formed. The chemistry of this reaction is described in "Isonitrile Chemistry", I. Ugi. Academic Press, Inc., New York, New York, 1971, Pages 67 and 68. This route is highly versatile in that N,N-arylene bis(amidines) of various substitution may be prepared; thus, mono-substituted bis-amidines and di-substituted bis-amidines (the substitution in each case being at the nitrogen atoms) are prepared by reacting aryl diisocyanide with two mols of ammonia and monoalkyl amine, respectively. Only tri-substituted bis-amidines can be prepared from a practical point of view by the routes indicated in Equations 1 and 2. These materials are also obtainable when the aryl diisocyanide is reacted with two mols of a dialkyl amine. The only limitation on this route is with regard to the substitution in the N,N-aryl bis(amidine) at the amidine carbon atom. This substitutent must be hydrogen, thereby always yielding a formamidine. The synthesis in Equations 1 and 2 are not limited with regard to the substitution at the amidine carbon. Formula XIV is a mono-substituted bisformamidine and Formula XV is a di-substituted bis-formamidine. Salt preparation involving Formulas XIV and XV with an organic dicarboxylic acid and heating of the resultant product yields the corresponding polymer and appropriate by-product. The polymer is dependent upon the diacid utilized and the by-products are formamide and an N-alkyl formamide, respectively, from the Formula XIV salt and the Formula XV salt.

N,N-arylene bis(amidines), therefore, may be prepared by the three methods previously described. In Equations 1, 2, and 3, R is alkyl or branched alkyl, halogen, alkoxy, aryloxy, carboalkoxy, carboaryloxy, and cyano. There may be up to four identical or differing R groups in each aromatic nucleus. In Equations 1 and 2 $R_1$ is hydrogen or lower alkyl. Where the aromatic nucleus is naphthylene, up to 6 identical or differing R substituents may be incorporated per naphthylene ring. In the unfused diphenyl ring systems, up to 4 identical or differing R substituents may be incorporated in each benzene ring. The two amidine moieties in the naphthylene series occupy any nonadjacent structural positions in the condensed ring nucleus and preferably 1,4; 1,5; 2,6; and 2,7. In Equation 3, $R_1$ must be hydrogen. In Equations 1 and 2, $R_2$ and $R_3$ must be lower alkyl and in Equation 3 $R_2$ and $R_3$ may each be selected from lower alkyl and hydrogen. In all three equations $R_2$ and $R_3$ may be part of the same heterocycloaliphatic entity. Specific examples of such ring systems based on the cycloaliphatic diamines from which the heterocycloaliphatic amide is derived include pyrrolidine, piperidine, azepine, and morpholine.

Thus, the N,N-arylene bis(amidines) useful in this invention may be of varied substitution ($R_1$, $R_2$, and $R_3$) within the amidine group depending upon the method of preparation. In specific examples, it will be shown that salt formation with aromatic dicarboxylic acids occurs when $R_1$ is hydrogen and $R_2$ and $R_3$ are each methyl and that the resulting salts when heated to a temperature of 225°C and higher yield a polyamide and dimethyl formamide.

Monoacid-substituted aryl amidine hydrochlorides

The preparation of monoacid-substituted arylamidine hydrochlorides is accomplished by procedures such as outlined in Examples 1 and 2. In these cases, the specific monoacid-substituted arylamidine, N-(p-carboxyphenyl)-N',N'-dimethyl formamidine hydrochloride and dihydrochloride have been prepared. Other methods useful for the preparation of N,N-arylene bis(amidines) which are chemically represented in Equations 2 and 3 are not generally useful for the preparation of monoacid-substituted arylamidines or their hydrochlorides. Equation 4 in the annexed drawings shows a method for the preparation of the monocarboxylic-substituted arylamidine hydrochlorides. The positive and negative charges in the Zwitter ion reside on the nonaryl nitrogen atom and on the oxygen, respectively. The $O^-$ is invariably a negative oxygen atom in the acid group and can therefore be part of a carboxylate. Similarly, in the monoacid-substituted arylamidine hydrochlorides, the positive charge resides on the nonaryl nitrogen and protonation occurs at the aryl nitrogen as indicated in the structure shown in Equation 4. The chemical basis for the assignment of charge and protonation site arises from NMR data acquired for the analagous N,N-1,4-phenylene bis-[N',N'-dimethyl formamidinium chloride]. This is discussed in Example 3.

It should be noted that the same mechanisms apply to the monoacid substituted arylamidinium hydrochlorides and Zwitter ion preparations in which the aryl group is naphthylene. The variables of the general naphthylene amino acid, amidinium hydrochloride and Zwitter ion remain the same as herein described for $R_1$, $R_2$, $R_3$, X, Y, A, B, and D. In the naphthylene series, however, up to 6 identical or differing R substituents may be incorporated in each naphthylene ring. The two amidinium moieties in the naphthylene ring occupy any nonadjacent structural positions, preferably 1,4; 1,5; 2,6; and 2,7 positions.

It should be emphasized that in all the monoacid substituted arylamidine compounds and the amino acids from which the latter are derived the acid group may or may not be covalently bound to an aromatic or heteroaromatic nucleus. That is, the acid function may be aromatic in which case it is covalently bound to an aromatic or heteroaromatic nucleus. Alternatively, it may be aliphatic in which case the acid function is covalently bound to an aliphatic or cycloaliphatic or heteroaliphatic or heterocycloaliphatic unit.

The amidine moieties in all of the monoacid-substituted aryl amidine compounds and the amino acids from which the latter are derived are aromatic. Thus, what was formerly the amino nitrogen and has been converted to an amidine nitrogen is directly bound to an aromatic or heteroaromatic nucleus. Aliphatic amidines derived from aliphatic amines in which the nitrogen that was formerly the amino nitrogen has been converted to an amidine nitrogen which is directly bound to an aliphatic or cycloaliphatic or heteroaliphatic or heterocycloaliphatic unit are of little value in the polymerization process. Although these materials are polymerizable in accordance with the present novel process, the resulting polymer products are more easily prepared from the amine by a less expensive process.

EXAMPLE 1

PREPARATION OF N-(p-CARBOXYPHENYL)-N',N'-DIMETHYL FORMAMIDINE DIHYDROCHLORIDE IN CHLOROFORM

A three-necked, one-liter round-bottom flask equipped with a nitrogen inlet, a mechanical stirrer, and a condenser which also serves as a gas exit for the bubbler, is charged with 300 ml of chloroform and 43.85 g of dry N,N-dimethyl formamide. The reaction vessel was externally cooled by a dry ice, carbon tetrachloride slush bath to a temperaure in the range of from −15° to −25°C. during the 35-minute period required to add 29.7 g of phosgene. Precondensed phosgene was warmed to boiling and evaporated into the reaction vessel. The molar ratio of dimethyl formamide to phosgene utilized is 2:1. Rapid carbon dioxide evolution is apparent during the phosgene addition and for 20 minutes thereafter when the vessel is allowed to warm to 5° − 10°C. There results a light yellow chloroform solution of dimethyl chloroformiminium chloride. To this solution is added 31.5 g (0.23 mol) of p-amino benzoic acid. The latter is added portion-wise over a period of 20 − 25 minutes, and the chloroform solution is maintained between 15° and 25°C. After a small amount of p-amino-benzoic acid has been added (approximately 10% of the amount to be added) a precipitate is formed which remains throughout the reaction. The mixture is stirred under nitrogen gas at room temperature for a period of 66 hours prior to vacuum filtering the white precipitate. The solid is dried at 60°C in a vacuum oven for 5.5 hours to yield 44.4 g. An additional 3 g of product is isolated after heating the reaction filtrate to 60°C. Upon standing in the atmosphere overnight, the crude solid liberates HCl. When a sample of the crude solid in a capillary tube is heated, melting with decomposition occurs between 208° and 213.5°C. Titration in a 2:1 water-to-ethanol by volume solution of the crude solid with 0.1 N NaOH results in a curve with two inflection points at pH 6.25 and 10.50. Two equivalents of base are required to reach the first inflection, and one equivalent for the second. The curve is interpreted as arising from the dihydrochloride of N-(p-carboxyphenyl)-N',N'-dimethyl formamidine. This interpretation of the results appears to be borne out when the monohydrochloride of N- (p-carboxyphenyl)-N',N'-dimethyl formamidine is prepared by the procedure set forth in U.S. Pat. No. 3,133,078. Similar titraton yields two inflection points at pH 6.25 and 10.50 but only one equivalent of base was required to reach inflection point.

Infrared analysis of the crude product (dihydrochloride) indicates one broad absorption band in the carbonyl region centered at 1708 cm$^{-1}$. The absorption is due to the carboxyl and protonated amidine moieties. In the case of the monohydrochloride, two absorptions are identifiable in the carbonyl region at 1700 and 1730 cm$^{-1}$. The former is believed due to the protonated formamidine, and the latter to the carboxyl carbonyl. When the crude product is isolated from strongly alkaline solution, the infrared spectrum displays the sodium carboxylate absorption at 1582 cm$^{-1}$ and the free formamidine absorption at 1640 cm$^{-1}$. The former is in the range for carboxylate anion absorption, and the latter is in close agreement with the absorption reported for N-phenyl-N',N'-dimethyl formamidine, an excellent model compound, at 1645 cm$^{-1}$ (A. Jootscheff and F. Falk, J. Prakt Chem. 13, 265 − 71 [1961]).

The bulk sample of 44.4 g is the dihydrochloride whereas the 3.0 g isolated from the warmed chloroform filtrate is found to have an infrared spectrum identical to that of the monohydrochloride. The combined yield of mono- and dihydrochlorides based on the amount of p-amino benzoic acid is 78.4%.

EXAMPLE 2

PREPARATION OF N-(p-CARBOXYPHENYL)-N',N'-DIMETHYL FORMAMIDINE MONOHYDROCHLORIDE IN CHLOROFORM

The same apparatus as described in Example 1 is utilized except that an ice bath is used as the cooling medium. The flask is charged with 300 ml of chloroform and 22.0 grams of N,N-dimethyl formamide. After cooling the reaction vessel to less than 5°C, 40 g of previously condensed phosgene is evaporated into the reaction vessel over a time period of 25 minutes. An exotherm to 10°C and a liberal evolution of CO$_2$ occurs during this time. The mol ratio of dimethyl formamide to phosgene utilized is 0.75. The resulting solution becomes yellow upon stirring for 75 minutes at room temperaure. Heating at reflux (63°C) is conducted for 2 hours during which time the excess phosgene is bubbled into a methanol-chloroform trap.

To the orange-red solution of dimethyl chloroformiminium chloride at 45°C is added 37.0 g (0.27 mol) of p-amino benzoic acid in equal portions over a time period of 10 minutes. The reaction mixture exotherms to chloroform reflux during the addition, and the orange-red color is discharged. Gas evolution is noted while the reaction mixture is near or at chloroform reflux. The gas has the odor of HCl and immediately causes moistened blue litmus to turn red. The reaction mixture is heated at reflux for 17 hours and is then cooled, vacuum filtered, and washed with chloroform. After briefly drying in a vacuum oven at 80°C, an infrared spectrum of the product is found to be identical to that of the monohydrochloride which is unequivocally prepared as in Example 1. Heating at reflux in chloroform is sufficient to convert the dihydrochloride to the monohydrochloride. The yield of the monohydrochloride is nearly quantitative.

Elemental analysis of the crude product in one case showed only 12.31% chlorine instead of the anticipated 15.5%, suggesting that some monohydrochloride may have been converted to the free formamidine during the chloroform reflux and vacuum heating periods. Recrystallization from various lower alkyl alcohols and mixtures thereof with water resulted in further chlorine decrease. Consistent with the formation of more free formamidine during recrystallization attempts was the appearance of shoulders and new absorptions in the 1640 − 1650 cm$^{-1}$ region of the infrared spectra of these samples. This region is characteristic of the free formamidine absorption as stated in Example 1. The elemental analysis, assuming a mixture of the hydrochloride and the free formamidine (probably in part as the Zwitter ion form) is reasonably consistent assuming 79.42% of the hydrochloride based on chloride analysis. Theory for such a mixture is presented along with the data obtained on the crude solid.

| Element | Theory | Found | | |
|---------|--------|-------|------|------|
| C | 54.57 | 54.23 | 53.96 | 53.87 |
| H | 5.84 | 5.42 | 5.57 | 5.40 |
| N | 12.73 | 11.86 | 11.40 | 11.74 |
| Cl(basis) | 12.31 | 12.24 | 12.39 | — |

The slightly low values found for carbon and nitrogen reflect the hygroscopic nature of the mixture. After storing the sample for several days without precautionary measures for exclusion of atmospheric moisture, a thermal gravimetric analysis (TGA) was conducted on the sample and revealed 7.7% weight loss under isothermal conditions at 175°– 180°C. This weight loss was assigned as water since the theoretical HCl and dimethyl formamide weight losses were accounted for in subsequent heating cycles. The thermal gravimetric analysis data appears in the following table:

| Conditions | Weight Loss % | Assignment | Theory (%) |
|------------|---------------|------------|------------|
| Isothermal at 175–180°C for 1.25 min. | 7.7 | water | — |
| Isothermal at 175–180°C for 197 min. | 16.7 | HCl & DMF | Wt. loss HCl anticipated from Cl analysis is 12.7 |
| Programmed from 175–225°C for 5 min. | 1.3 | HCl & DMF | Wt. loss DMF anticipated from polymerization stoichiometry is 33.0 |
| Programmed from 225–350°C for 12.5 min. | 28.2 | HCl & DMF | — |
| Programmed from 350–550°C for 20 min. | 5.1 | slow decomposition | — |

It is difficult to clearly assign the time at which all the HCl is evolved. Polymerization proceeds very slowly at 175°– 180°C and the bulk of the polymerization occurs between 225° and 350°C. Decomposition occurs at temperatures greater than 500°C. These data are in agreement with the experimental observations that HCl evolution occurs at temperatures equal to or above 125°C, and copious dimethyl formamide (DMF) evolution occurs at temperatures equal to or greater than 225°C. The total weight of HCl and DMF lost (46.2%) in the thermal gravimetric analysis is in close agreement with the theoretically anticipated weight loss of 45.7%.

Polymerization of the crude mixture of monochloride and free formamidine is similar to the detailed polymerization procedure provided herein and yields a polymer with an inherent viscosity of 0.85. Recrystallization of the crude solid from isopropanol to water (5:3 by volume) yields a monomer which has increased free formamidine relative to the crude material. Polymerization of the recrystalized monomer yields a polymer with an inherent viscosity od 0.99 as indicated in the detailed polymerization procedure given below. Recrystallization does not significantly affect the ultimate degree of polymerization or gel formation therein. This result indicates that the amount of hydrogen chloride is inconsequential to the final outcome of the polymerization.

EXAMPLE 3

PREPARATION OF N,N-1,4-PHENYLENE BIS(N',N'-DIMETHYL FORMAMIDINIUM CHLORIDE) IN N,N-DIMETHYL FORMAMIDE

The apparatus utilized is identical to that described in Example 1. The flask is charged with 500 ml of dry dimethyl formamide (previously distilled from calcium hydride) which is cooled with an ice bath at 0 – 5°C. To the cooled reagent-solvent is added 81.4 grams (0.82 mol) of precondensed phosgene over a time period of 1.5 hours. The liquid phosgene is evaporated from an external flask into the reaction vessel containing the dimethyl formamide. The rate of addition of the gaseous phosgene is maintained at such a rate that the exotherm does not exceed 10°C. Copious $CO_2$ evolution is observed during the phosgene introduction and a thick slurry of dimetyl chloroformiminium chloride develops. The mixture is recooled to 0°– 5°C and a dimethyl formamide solution (150 ml) containing 41.6 g (0.385 mol) of p-phenylene diamine is poured into the stirred slurry in four equal portions. An exotherm to 25°C is observed in spite of the surrounding ice bath. The thick slurry of dimethyl chloroformiminium chloride becomes less copious although a clear solution never forms. The mixture is stirred for 17 hours at ambient temperature under nitrogen and is then vacuum filtered and washed with 100 – 200 ml of diethyl ether. The crude solid is then dried at 60°C in a vacuum oven for 5 hours and amounts to 109.3 g (97.7% of theory) calculated as the N,N-1,4-phenylene bis(N',N'-dimethyl formamidinium chloride).

The crude solid does not melt in a capillary tube but undergoes oxidative burning at temperatures greater than 250°C. The infrared spectrum is characterized by a strong absorption centered at 1700 $cm^{-1}$ which is assignable to the protonated formamidine (imine-like double bond). The NMR spectrum of this salt in $D_2O$ displays a doublet centered at 3.29δ (methyl), an aromatic singlet at 7.34δ, and the methine singlet at 8.32δ in a ratio of 6:2:1. This spectrum is consistent with the bis-formamidine structure and also indicates protonation at the phenyl nitrogens. The structure of the salt so indicated is Formula X where the ring nitrogens are para related.

Elemental analysis of a crude sample of the salt indicates the bis-hydrochloride from the carbon and chlorine analysis, but the hydrogen and nitrogen analysis favored the monochloride.

| Element | Theory for Monohydrochloride | Dihydrochloride | Found | |
|---------|------------------------------|-----------------|-------|-------|
| C | 56.57 | 49.49 | 49.90, | 49.52 |
| H | 7.52 | 6.92 | 7.34, | 7.26 |
| N | 21.99 | 19.24 | 22.15, | 21.98 |
| Cl | 13.92 | 24.35 | 25.72, | 25.79 |

The somewhat ambiguous data indicates labile hydrogen chloride loss in sampling. A hydrochloride of N,N-1,4-phenylene bis(N',N'-dimethyl formamidine) has been reported to melt with decomposition between 200° and 210°C, but no elemental analysis is provided (see H. Bredereck, F. Effenberger, and H. Botsch, Chem. Ber. 97 [12], 3397 – 3406 [1964]).

EXAMPLE 4

PREPARATION OF N,N-1,4-PHENYLENE BIS(N',N'-DIMETHYL FORMAMIDINE)

A solution of 10 g (0.034 mol) of N,N-1,4-phenylene bis-(N',N'-dimethyl formamidinium chloride) in 75 ml of water is poured into a separatory funnel along with some ice and 75 ml of chloroform. After adding 40 ml of 2N sodium hydroxide in 10 ml increments, the aqueous layer is strongly basic to pH paper. The two layers are shaken vigorously and the chloroform layer is separated and washed with 75 ml of distilled water. The original aqueous layer is again extracted with chloroform (50 ml), and the combined chloroform layers are dried over anhydrous sodium sulfate. The drying agent is vacuum filtered and the chloroform filtrate evaporated with a rotoevaporator at reduced pressure at 60°C to yield 6.34 g (0.29 mol of the free bis-formamidine) of product which is an 84.5% yield. The melting point is 119.5° – 120.5°C (recrystallized from heptane) and compared favorably with the melting point obtained by Bredereck et al. of 121°C (recrystallized from petroleum ether). The overall yield in this procedure based on phenylene diamine is 82.6% which is a considerable improvement over the Bredereck procedure wherein a 32% yield was noted.

The infrared spectrum of the free formamidine displays the imine double bond of the formamidine groups at lower frequency (1625 cm$^{-1}$) relative to the hydrochloride salt in Example 1 (1700 cm$^{1-}$). The NMR spectrum of the free formamidine in deuterochloroform displays 3 singlets at 2.93, 6.87, and 7.51δ in a ratio of 6:2:1. These spectra are consistent with the assigned structure. Elemental analysis of the once recrystallized free formamidine is found to be reasonably close to the theoretical values. Slight contamination by hydrogen chloride appears to explain the low carbon and nitrogen values.

| Element | Theory | Found |
|---------|--------|-------|
| C | 66.02 | 64.96 |
| H | 8.31 | 8.78 |
| N | 25.67 | 25.23 |

The free formamidine in the crude state is of sufficient purity for the preparation of salts from dicarboxylic acids.

Aromatic Diacids

The general formulas which are representative of the dicarboxylic acids useful in accordance with this invention are shown as Formulas XI and XII in the annexed drawings. In general, these dicarboxylic acids are monobenzenoid or dibenzenoid acids wherein the acid forming radical is based upon carbon as in carboxyl. The particular nature of the dicarboxylic aromatic acid appears to be unimportant so long as it is capable of forming a salt with the bis-formamidine material. It is the presence of an acidic hydroxyl group in the acid radical that appears to be controlling of the utility of these materials in this invention. Specific examples of dicarboxylic aromatic acids useful in accordance herewith are as follows:

isophthalic acid
terephthalic acid
diphenic acid
naphthalene-1,5-dicarboxylic acid
naphthalene-2,6-dicarboxylic acid As indicated above, aliphatic dicarboxylic acids may also be used in the formation of mixed aromatic-aliphatic polymerizable monomers in accordance with the present invention. These may be of the same nature as indicated for the aromatic dicarboxylic acids with the exception that in place of the benzenoid structure in either of Formulas XI or XII, there may be substituted an alkylene or cycloalkylene radical. Although the aliphatic dicarboxylic acids will undergo the same kind of reaction as the aromatic dicarboxylic acids, and the resulting salts with bisamidines may be polymerized in the same manner, the procedure is not presently commercially desirable because there are cheaper ways of arriving at aliphatic polyamides. Thus, an aromatic bis(formamidine) reacted with an aliphatic dicarboxylic acid yields a useful polymerizable salt in accordance herewith. An aromatic dicarboxylic acid may be substituted for part or all of the aliphatic dicarboxylic acid to yield a useful polymerizable salt in accordance herewith. But, to produce a fully aliphatic polyamide by reacting an aliphatic bis-(formamidine) with an aliphatic dicarboxylic acid, while workable, is currently too costly a procedure.

Polymerization Mechanisms

In the annexed drawings, Mechanism 1 illustrates a suggested means by which aromatic polyamides are produced from a bisamidine salt of a dibasic aromatic acid. The polymer results from heating the monomeric bis-amidine dibasic acid salt at a temperature at or above 225°C, but below decomposition temperature to effect the evolution of a dialkyl alkamide such as dimethyl formamide. As indicated, the resulting polymers have inherent viscosities which range from about 0.6 to about 1.0. These polyamides are linear and useful in forming fibers by known techniques.

It is important to point out that polymerization of the salt is not the only novel route by which the polymers of the present invention may be made. Alternatively, the polymer may be formed by subjecting stoichiometric amounts of the bis-amidine compound and the dicarboxylic acid to the polymerization conditions, e.g. heating at a temperature at or above about 225°C.

It becomes convenient to illustrate the preparation of an aromatic polyamide in accordance with postulated Mechanism 1 as follows:

EXAMPLE 5

PREPARATION OF A SALT AND AN AROMATIC POLYAMIDE, SPECIFICALLY N,N-1,4-PHENYLENE BIS-(N',N'-DIMETHYL FORMAMIDINIUM) TEREPHTHALATE AND THE POLYMERIZATION THEREOF TO POLY (p-PHENYLENE TEREPHTHALAMIDE)

To a beaker containing 250 ml of distilled water and 200 ml of ethanol is added 10.90 g (0.05 mol) of N,N-1,4-phenylene bis(N',N'-dimethyl formamidine) from Example 4 above. To the resulting solution at room temperature with stirring there is added 8.30 g (0.05 mol) of terephthalic acid, and after stirring for 30 minutes, the nearly total solution is filtered to remove minor quantities (mg) of undissolved solid. The filtrate is poured into 1500 ml of well stirred tetrahydrofuran at room temperature, resulting in the immediate formation of a precipitate. The resulting salt is vacuum filtered and dried in a vacuum oven at room temperature and amounts to 18.90 g (98.5% of theory). The salt was found to decompose in a capillary tube in a temperature range of 193° – 210°C. A 1 g sample of the salt is found to lose 0.17 g (presumably water) after 35 minutes in an oven at 100°C. The dehydrated salt analyzes as follows:

| Element | Theory | Found | | |
|---------|--------|-------|-------|-------|
| C | 62.48 | 62.22 | 61.85 | 61.22 |
| H | 6.29 | 6.48 | 6.37 | 6.38 |
| N | 14.57 | 14.37 | 14.52 | 14.10 |

The imine-like absorption of the formamidine group in the salt occurs in the infrared spectrum at 1695 cm$^{-1}$ compared with 1622 cm$^{-1}$ for the free formamidine. The NMR spectrum of the salt in deuterium oxide displays a doublet centered at 3.22δ (methyl), two aromatic singlets at 7.12 and 7.66δ, and the methine singlet at 8.15δ in a ratio of 6:2:2:1. Since the methine resonance appears as a singlet, there is no coupling between the methine hydrogen and methyl hydrogen. The methyl doublet, therefore, appears to arise from chemical nonequivalence which indicates considerable double bond character between the geminal dimethyl nitrogens and the methine carbons. Protonation at the phenyl nitrogens in the 1:1 salt is most consistent with the above NMR data. The structure of the salt indicated is illustrated by Formula VIII wherein $R_1$ is hydrogen, $R_2$ and $R_3$ are each methyl, Ar is phenylene, and R is phenylene.

The crude white salt (7.68 g) is dissolved in 200 ml of deionized water. The pH is 5.65. The solution is titrated with 0.100N sodium hydroxide to a pH of about 6.8 and the salt reisolated by precipitation in tetrahydrofuran. Recovery is 87%. 6.7 g of the titrated salt is mixed with 25 ml of a 50:50 mixture of biphenyl and diphenyl ether in a resin kettle equipped with a reflux condenser, nitrogen inlet and outlet, and a mechanical stirrer. The suspension under a nitrogen blanket is immersed in hot Woods metal at 250° ± 10°C. The mixture is allowed to reflux for 45 – 60 minutes before converting the reflux condenser to a side arm for removal of solvent and dimethyl formamide. After an additional 3 hours, all the volatiles are removed and a dry brown solid remains. Very little sublimation occurs. The temperature is increased to 325°C over the next two-hour period while maintaining a gentle nitrogen sweep. The thermally quenched solid is found to have an inherent viscosity of 0.58. The sample is reheated in a slow nitrogen stream for 4 hours at 250° – 310°C before applying a vacuum (0.15 mm Hg) for 1.5 hours in the temperature range of 310° – 325°C. The thermally quenched brown solid has an inherent viscosity of 0.95 and contains a small amount of insoluble material such that the polymer solution flow times in an Ostwald-type viscometer differ by only 0.13% at the 1/2% (g/dec) concentration level. The infrared spectrum of the product is identical to that of poly(p-phenylene terephthalamide) prepared from terephthaloyl chloride and p-phenylene diamine.

When a sample of dehydrated salt as above prepared is subjected to the above polymerization conditions without prior base titration, a polymer with an inherent viscosity of 0.51 is obtained. The absence of hydrogen chloride in the salt as a residue from the previous monomer preparation step is confirmed by analysis. The apparent base catalysis does not emmanate from strong acid neutralization but apparently from a retardation of terephthalic acid sublimation. The latter may be accounted for if the salt partially reverts (low steady state concentration) to its components at elevated temperatures.

EXAMPLE 6

PREPARATION OF A SALT AND A MIXED AROMATIC-ALIPHATIC POLYAMIDE, SPECIFICALLY N,N-1,4-PHENYLENE BIS(N',N'-DIMETHYL FORMAMIDINIUM) AZELATE AND POLYMERIZATION THEREOF TO POLY(p-PHENYLENE AZELAMIDE)

To 2.18 g (0.01 mol) of N,N-1,4-phenylene bis(N',-N'-dimethyl formamidine) dissolved in 20 ml of isopropanol is added a 20 ml isopropanol solution of 1.88 g (0.01 mol) of azealaic acid. A yellow-green solution is formed which does not yield a precipitate upon copious dilution with tetrahydrofuran or diethyl ether. A portion of the isopropanol solution containing the salt is cooled to −15°C overnight. A small amount of a yellow precipitate is formed which is rapidly vacuum filtered and transferred to a small flask and immediately stoppered. The solid becomes partially liquified after standing for 20 minutes at room temperature. The liquid is decanted and the flask thoroughly evacuated (0.1 mm Hg) at room temperature for 1.5 hours. A yellow crystalline solid remains which shows a strong imine absorption at 1695 cm$^{-1}$ in the infrared spectrum.

The yellow solid is polymerized in the solid state by immersing an evacuated flask (0.25 mm Hg) containing the salt into a Woods Metal bath at 80°C and increasing the temperature to 155°C over a period of 1 hour. The melting point of the salt is less than 80°C since the solid immediately melted when exposed to this temperature. The vacuum is removed and the nitrogen exit fumes from the flask are basic to moist litmus, indicating dimethyl formamide evolution and the commencement of polymerization. At 195°C a light yellow solid has formed and the temperature is now increased to a maximum of 255°C. The total time of polymerization is 3.2 hours with vacuum reapplied in the final 0.2 hour at 255°C. The light yellow solid resulting is found to have an inherent viscosity of 0.81 and contains a very small amount of insoluble material at 1/2% (g/dec) in concentrated sulfuric acid. The melting point from DTA is found to be 331.9°C.

EXAMPLE 7

PREPARATION OF A SALT AND A MIXED AROMATIC ALIPHATIC POLYAMIDE, SPECIFICALLY N,N-1,4-PHENYLENE BIS(N',N'-DIMETHYL FORMAMIDINIUM) ADIPATE AND POLYMERIZATION THEREOF TO POLY(p-PHENYLENE ADIPAMIDE)

To 10.91 g (0.05 mol) of N,N-1,4-phenylene bis(N',-N'-dimethyl formamidine) produced in accordance with Example 4 above dissolved in 50 ml of methanol is added a warmed solution of 7.31 g (0.05 mol) of adipic acid in 50 ml of methanol. The resulting solution is stirred for 20 to 30 minutes at 30° to 40°C. The solution is then precipitated with copious amounts of diethyl ether. The white-gray solid is filtered by suction, washed with more ether and then dried at 60°C overnight in a vacuum oven. The yield is 10.72 g (59% of theory). A differential thermal analysis (DTA) of the salt indicates a melting point at 116°C and decomposition at 225°C.

The salt was polymerized both in the solid state and from an N-methyl pyrrolidone solution, the latter terminating in a solid state polymerization.

5.0 g of the salt is placed in a miniature resin kettle and the kettle immersed in Woods Metal at 250°C while maintaining a gentle nitrogen stream and mechanical stirring. The solid melts immediately and a liquid (DMF) is swept out in the nitrogen stream. The temperature is maintained at 250° – 295°C for 5 hours and the light brown solid resulting is thermally quenched. This material has an inherent viscosity of 0.48. The solid is pulverized and resubmitted to polymerization conditions during which the temperature is maintained at 280° – 290°C for 4 hours at a pressure of 0.15 to 0.40 mm Hg. The resulting product has an inherent viscosity of 0.94 and contains a very small amount of insoluble material at 1/2% (g/dec) in concentrated sulfuric acid.

Solution polymerization was partially effected in the following manner: 4.7 g of the salt is mixed with 35 ml of dry N-methyl pyrrolidone in a miniature resin kettle. A solution is formed when the reaction vessel is heated at 150°C in a Woods Metal bath. The temperature is maintained in the range of 150° – 210°C under a gentle nitrogen sweep for 3.5 hours. There results dry tan solid residue. The residue is heated for 2.5 hours at 210 – 310°C and finally for 17 hours at 310° – 330°C under vacuum (0.2 mm Hg). The solid is thermally quenched under nitrogen and shows an inherent viscosity of 1.98 (1/2% in concentrated $H_2SO_4$ at 25°C). A small amount of gel remains in the viscosity solution such that the flow times differed by only 0.39%. No crystalline melting point was apparent in the differential thermal analysis.

Referring to the drawings, Mechanism 2, there is here illustrated by general formula a proposed mechanism for the formulation of aromatic polyamides by the thermal polymerization of amidine-acid hydrochlorides.

The following specific example is illustrative of this procedure:

EXAMPLE 8

PREPARATION OF AN AROMATIC POLYAMIDE, SPECIFICALLY POLY(p-BENZAMIDE) FROM N-(p-CARBOXYPHENYL)-N',N'-DIMETHYL FORMAMIDINE HYDROCHLORIDE

To a small glass resin kettle equipped with a nitrogen inlet and outlet and a mechanical stirrer is added 1.80 g of N-(p-carboxyphenyl)-N',N'-dimethyl formamidine hydrochloride produced in accordance with Example 1 above. A gentle nitrogen stream is maintained over the sample during immersion of the reaction vessel into a Woods Metal bath at 100°C. The monomer was found to decompose in a capillary tube at 256°C.

In a two-hour period the temperature is allowed to increase to 265°C during which time the contents of the reaction vessel proceed through a semi-molten stage with the evolution of a volatile liquid and acidic fumes. Acid fumes are detected in the nitrogen exit stream at temperatures from 125°C through the resolidification process at 265°C. The molten stage for this sample of monomer, which was recrystallized from isopropanol and water, occurs at from 255° to 265°C. In the case of unrecrystallized monomer which likely contains more bound hydrogen chloride, the semi-molten stage occurs at a lower temperature (220° – 230°C).

A vacuum (less than 1.0 mm Hg) is applied to the beige solid which forms while increasing the temperature to 380°C in an additional 1.25 hours. Vacuum, stirring, and heating are maintained for an additional 1.4 hours at 380° – 395°C. The resulting light brown solid is thermally quenched under nitrogen and is found to have an inherent viscosity (1/2% in concentrated $H_2SO_4$ at 25°C) of 0.93. Further heating between 395° and 405°C under vacuum for about one hour results in a slight increase in viscosity (0.99) and causes a small amount of gel formation and darkening of the polymeric powder.

This product has an infrared spectrum identical to that of poly(p-benzamide) prepared from p-amino benzoyl chloridehydrochloride.

What is claimed is:

1. A process for forming a filament forming, aromatic polyamide which comprises heating an amidine composition of matter characterized by the group:

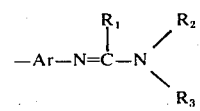

to a temperature of at least 225°C where a volatile alkyl amide is evolved, said amidine comprising:
a dibasic acid salt of a bis-amidine having the general formula:

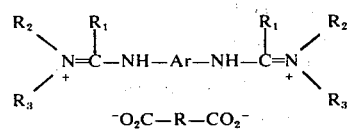

wherein Ar is a divalent aromatic radical, $R_2$ and $R_3$ are each a lower alkyl radical containing from 1 to 3 carbon atoms, and $R_1$ is hydrogen or a $C_1 - C_3$ lower alkyl group.

2. A process of forming a filament forming, aromatic polyamide which comprises heating to a temperature of at least 225°C where a volatile alkyl amide is evolved a polymerizable composition comprising the salt formed from the interaction of equimolar amounts of a. an aromatic bis-alkamidine having the general formula:

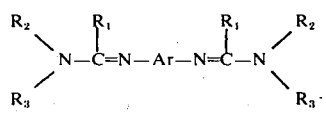

wherein Ar is a divalent aromatic radical, $R_2$ and $R_3$ are each a lower alkyl radical containing from 1 to 3 carbon atoms, and $R_1$ is hydrogen or a $C_1 - C_3$ lower alkyl group; and b. a dicarboxylic acid.

3. A process in accordance with claim 2 wherein $R_2$ and $R_3$ are each methyl.

4. A process in accordance with claim 2 wherein $R_1$ is hydrogen.

5. A process in accordance with claim 2 wherein $R_2$ and $R_3$ are each methyl and $R_1$ is hydrogen.

6. A process in accordance with claim 2 wherein Ar is phenylene.

7. A process in accordance with claim 2 wherein Ar is 1,4-phenylene.

8. A process in accordance with claim 2 wherein Ar is 1,4-phenylene, $R_2$ and $R_3$ are each methyl and $R_1$ is hydrogen.

9. A process in accordance with claim 2 wherein the dicarboxylic organic acid is a dicarboxylic aliphatic acid.

10. A process in accordance with claim 2 wherein the dicarboxylic acid is an aromatic dicarboxylic acid.

11. A process in accordance with claim 10 wherein the aromatic dicarboxylic acid is a phenylene dicarboxylic acid.

12. A process in accordance with claim 11 wherein the phenylene dicarboxylic acid is terephthalic acid.

13. A process in accordance with claim 8 wherein the dicarboxylic acid is terephthalic acid.

14. A process of forming a filament forming, aromatic polyamide which comprises heating to a temperature of at least 225°C where a volatile amide is evolved a polymerizable composition comprising in combination:

a. an aromatic bias-alkamidine having the general formula

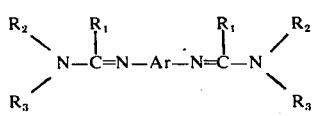

wherein Ar is a divalent aromatic radical, $R_2$ and $R_3$ are a lower alkyl radical containing from 1 to 3 carbon atoms, and $R_1$ is hydrogen or a $C_1 - C_3$ lower alkyl group;

b. a dicarboxylic acid.

15. A process in accordance with claim 14 wherein $R_2$ and $R_3$ are each methyl.

16. A process in accordance with claim 14 wherein $R_1$ is hydrogen.

17. A process in accordance with claim 14 wherein $R_2$ and $R_3$ are each methyl and $R_1$ is hydrogen.

18. A process in accordance with claim 14 wherein Ar is phenylene.

19. A process in accordance with claim 14 wherein Ar is 1,4-phenylene.

20. A process in accordance with claim 14 wherein Ar is 1,4-phenylene, $R_2$ and $R_3$ are each methyl and $R_1$ is hydrogen.

21. A process in accordance with claim 14 wherein the dicarboxylic organic acid is a dicarboxylic aliphatic acid.

22. A process in accordance with claim 14 wherein the dicarboxylic acid is an aromatic dicarboxylic acid.

23. A process in accordance with claim 22 wherein the aromatic dicarboxylic acid is a phenylene dicarboxylic acid.

24. A process in accordance with claim 23 wherein the phenylene dicarboxylic acid is terephthalic acid.

25. A process in accordance with claim 20 wherein the dicarboxylic acid is terephthalic acid.

* * * * *